United States Patent
Wetzig et al.

(10) Patent No.: US 8,752,412 B2
(45) Date of Patent: Jun. 17, 2014

(54) SNIFFING LEAK DETECTOR

(75) Inventors: Daniel Wetzig, Köln (DE); Stefan Mebus, Köln (DE); Norbert Rolff, Horrem (DE)

(73) Assignee: Inficon GmbH, Cologne (DE)

( * ) Notice: Subject to any disclaimer, the term of this patent is extended or adjusted under 35 U.S.C. 154(b) by 638 days.

(21) Appl. No.: 12/677,631

(22) PCT Filed: Sep. 1, 2008

(86) PCT No.: PCT/EP2008/061507
§ 371 (c)(1),
(2), (4) Date: Jul. 12, 2010

(87) PCT Pub. No.: WO2009/033978
PCT Pub. Date: Mar. 19, 2009

(65) Prior Publication Data
US 2010/0294026 A1    Nov. 25, 2010

(30) Foreign Application Priority Data

Sep. 12, 2007  (DE) .......................... 10 2007 043 382

(51) Int. Cl.
G01M 3/04 (2006.01)
G01N 1/14 (2006.01)
G01N 1/16 (2006.01)

(52) U.S. Cl.
USPC .......................... 73/40; 73/863.83; 73/863.31

(58) Field of Classification Search
USPC ............. 73/40.7, 40, 49.2, 49.3, 863, 863.01, 73/863.31, 863.33, 863.41, 863.61, 73/863.71, 863.83
See application file for complete search history.

(56) References Cited

U.S. PATENT DOCUMENTS

| | | | | |
|---|---|---|---|---|
| 3,690,151 A | * | 9/1972 | Briggs | 73/40.7 |
| 5,417,105 A | | 5/1995 | Martinez et al. | 73/40.7 |
| 6,314,793 B1 | | 11/2001 | Webb et al. | 73/40.7 |
| 2004/0154379 A1 | * | 8/2004 | Enquist et al. | 73/40.7 |
| 2006/0169028 A1 | * | 8/2006 | Beyer et al. | 73/40.7 |

FOREIGN PATENT DOCUMENTS

| | | |
|---|---|---|
| DE | 102005009713 | 11/2007 |
| DE | 102005021909 | 1/2008 |
| EP | 0475246 | 3/1992 |
| EP | 0534825 | 3/1993 |
| WO | WO 90/14587 | 11/1990 |
| WO | WO 99/10721 | 3/1999 |
| WO | WO 02/045268 | 9/2002 |

OTHER PUBLICATIONS

International Search Report for PCT/EP2008/061507 dated Jan. 19, 2009.

* cited by examiner

*Primary Examiner* — Daniel S Larkin
*Assistant Examiner* — Jamar Ray
(74) *Attorney, Agent, or Firm* — Ohlandt, Greeley, Ruggiero & Perle, LLP

(57) ABSTRACT

A sniffing leak detector which comprises a first suction line in a sniffing probe, the line leading to a main device, is provided with a larger second suction line through which gas is sucked in from the sniffing tip by a gas delivery pump. By connecting the second suction line, the distance sensitivity is increased. By disconnecting the second suction line, on the other hand, the sensitivity is increased. Thus, it is possible to first search for leaks by use of a high gas throughput and subsequently exactly determine the leaks under the quantitative aspect by use of a reduced flow.

5 Claims, 1 Drawing Sheet

SNIFFING LEAK DETECTOR

BACKGROUND

1. Field of the Invention

The disclosure relates to a sniffing leak detector comprising a sniffing probe which, via a first suction line leading to a test gas sensor, is connected to a main device including a vacuum pump device.

2. Discussion of the Background Art

Normally, in leak testing of containers and pipe systems, helium is used as a test gas, and the leakage of helium is detected with the aid of a mass spectrometer or another test gas sensor.

DE 10 2005 021 909 A1 (INFICON) describes a sniffing leak detector comprising a sniffing probe to be guided by hand so as to examine a test object for leaks from which test gas is escaping. Via a flexible sniffing line, said sniffing probe is connected to a main device which includes the test gas sensor and the required vacuum pump device.

DE 10 2005 009 713 A1 (INFICON) describes a leak detector comprising a sniffing probe, wherein the sniffing probe is connected to the main device via a hose line including at least two capillary lines. With the aid of valves, said capillary lines can be shut off individually or in groups. By selecting a desired number of capillary lines, the magnitude of the conveying gas flow sucked into the sniffing probe can be changed. Thus, it is possible to select the flow into the sniffing probe to be large so that the response time will be reduced to a minimum and, nonetheless, a sufficient quantity of air will be taken up by the sniffing probe even from a larger distance. The smallest verifiable leakage rate corresponds to the smallest detectable test gas concentration. Thus, the smallest verifiable leakage rate will worsen with increased gas flow into the sniffing probe. By using a plurality of capillaries, it is achieved that a suitable gas flow can be selected for a given application without the need to change the hose line. The concentration of the test gas in the sucked-in gas flow is a measure for the leakage rate. For precise determination of the leakage rate, it is required that, during the measurement, the gas flowing out of a leak will be sucked in completely. The larger the sucked-in conveying gas flow is, the higher the distance sensitivity will be. The term "distance sensitivity" is to be understood as the ability of performing a leak detection at a larger distance from the test object. The sensitivity stands in contrast thereto. The sensitivity will be all the higher, the smaller the leakage rate is that can just about be detected. Two difficulties have to be eliminated. The provision of a large gas flow passing through the suction line will result in increased demands to the line and pump system. On the other hand, there have to be guaranteed a high distance sensitivity and a high sensitivity.

It is an object of the disclosure to provide a sniffing leak detector which fulfils the above demands and is able to search for leaks by use of a high gas throughput and thus to find a leak with high distance sensitivity and, finally, to quantitatively determine the leak with high accuracy by use of a reduced flow.

SUMMARY

The sniffing leak detector is characterized in that the sniffing probe is provided with a second suction line which has a higher conveying capacity than the first suction line, and that said second suction line can be shut off and, without connection to the testing sensor, is directly connected to a gas conveying pump for conveyance into the environment.

One feature of the disclosure consists in that the sniffing leak detector is capable of selectively generating a large gas flow and a small gas flow. Thus, in one case, a large quantity of gas will be sucked into the sniffing probe. The major portion of this gas will subsequently be blown out into the environment. With the aid of the first suction line, a portion of the sucked gas flow will be taken out of the large gas flow. The test gas concentration will be detected by the analyzing unit, and the leak rate will be determined from the measured concentration. The conveying capacity indicates the suctional performance of the respective suction line under consideration of the suctional performance of the connected suction pump, i.e. it indicates the conveying gas flow in the respective suction line.

For switching the sniffing leak detector to "normal operation", the second suction line will be shut off, which can be done either by actuating the shut-off member or by switching off the connected gas conveying pump. The gas flow will then be conveyed exclusively through the first suction line leading to the test gas sensor. If, for instance, the gas flow at normal operation is only 10% of the large conveying gas flow, the concentration during normal operation is ten times larger so that also the sensitivity will be ten times larger.

According to a preferred embodiment of the disclosure, the sniffing probe comprises a handle which is provided with or connected to the second suction line, and that said handle includes a gas conveying pump connected to the second suction line. Said gas conveying pump can be a ventilator or a membrane pump. The pump must have a high conveying capacity and serves merely for increasing the quantity of the sucked-in gas. From said handle, this second gas flow will be blown out directly into the environment so that it will not even reach the main device at all.

According to a further variant of the disclosure, it is provided that the second suction line is connected to a gas conveying pump included in the main device. In this arrangement, two (or more) suction lines extend between the handle and the main device. Within the main device, the first suction line leads to the test sensor, and the second suction line leads to a gas conveying pump. The gas conveying pump can be a component of the vacuum pump device generating the required vacuum for the test gas sensor. Such a pump device consists of a high vacuum pump and a pre-vacuum pump, the second suction line being connected to the suction intake of the pre-vacuum pump.

The test gas sensor can also be accommodated in the sniffing probe, e.g., in the handle.

Embodiments of the disclosure will be explained in greater detail hereunder with reference to the drawings.

DETAILED DESCRIPTION OF THE PREFERRED EMBODIMENT

Figure 1:
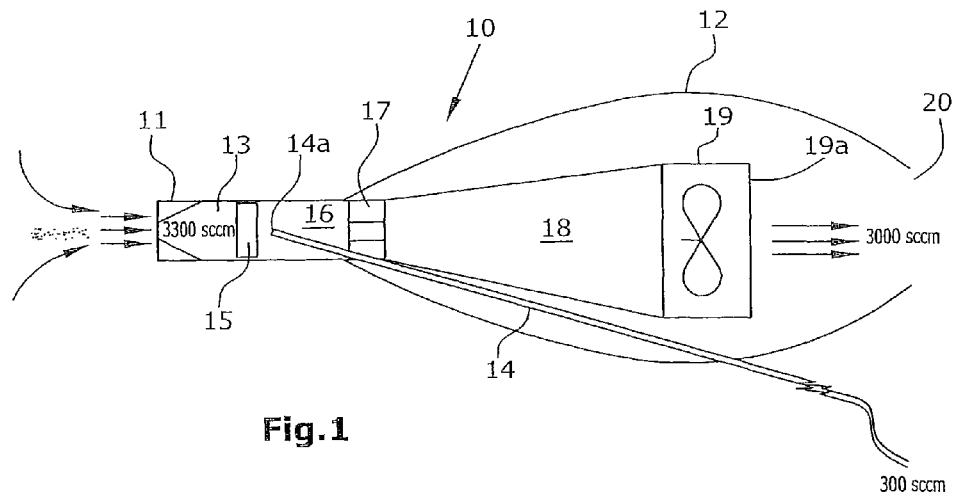
FIG. 1 shows a schematic view of a first embodiment of the disclosure, wherein the gas conveying pump is accommodated in the handle of the sniffing probe.

In FIG. 1, a sniffing probe 10 is illustrated which comprises a sniffing tip 11 and a handle 12. From said sniffing tip 11, a channel 13 leads to the inlet end 14*a* of a first suction line 14. Suction line 14 consists of a flexible capillary which is connected to a main device which is not shown in FIG. 1. The main device substantially corresponds to the device according to DE 10 2005 021 909 A1 (INFICON). The main device includes a test gas sensor and a vacuum pump device as well as the required control units and adjusting elements.

Said channel 13 includes, downstream of a filter 15, a distributing chamber 16 having arranged within it the inlet end 14a of first suction line 14. Via a shut-off member 17 in form of a controllable valve, said distributing chamber 16 communicates to a second suction line 18 to which a gas conveying pump 19 is connected. The outlet 19a of gas conveying pump 19 leads into the environment. Suction line 18 and gas conveying pump 19 are arranged internally of handle 12, the latter comprising an opening 20 for blowing gas therethrough into the environment.

When said sniffing tip 11 is held near a test object from which there is leaking a test gas, e.g. helium, the sniffing tip will suck in a mixture of test gas and ambient air. The suctional intake is performed on the one hand via first suction line 14 and on the other hand via said gas conveying pump 19 connected to second suction line 18. Examples of the respective gas quantities are indicated in FIG. 1. The whole sucked-in gas quantity would here amount to 3300 sccm (standard cubic centimeters). This gas flow is subdivided into a larger gas flow of 3000 sccm passing through gas conveying pump 19 and a smaller gas flow of 300 sccm passing through suction line 14. In this case, the volume ratio is 11:1. It should be at least 5:1.

When the shut-off member 17 is in the open state, a high distance sensitivity is achieved because the conveying gas flow is high. The concentration of the test gas is calculated as follows:

$$c = \frac{Q_{leak}}{Q_{conveying\ gas\ flow}} + c_0$$

$c$: test gas concentration in the gas flow $c_0$: test gas concentration in the air $Q_{leak}$: leak rate at the test object $Q_{conveying\ gas\ flow}$: conveying gas flow sucked into the sniffing tip The test gas concentration in the gas flow is determined by the ratio between the existing leak rate and the conveying gas flow. $c_0$ indicates the basic concentration which is already contained in the conveying gas medium (e.g. 5 ppm He in air).

The leakage rate information will be obtained by the analyzing unit in the main device via measurement of the test gas concentration in the conveyed gas flow. Since the concentration is distributed homogeneously within the handle, the splitting of the flow can be carried out already in said distributing chamber 16 in the handle without occurrence of a loss of information on the leakage rate.

Figure 2:
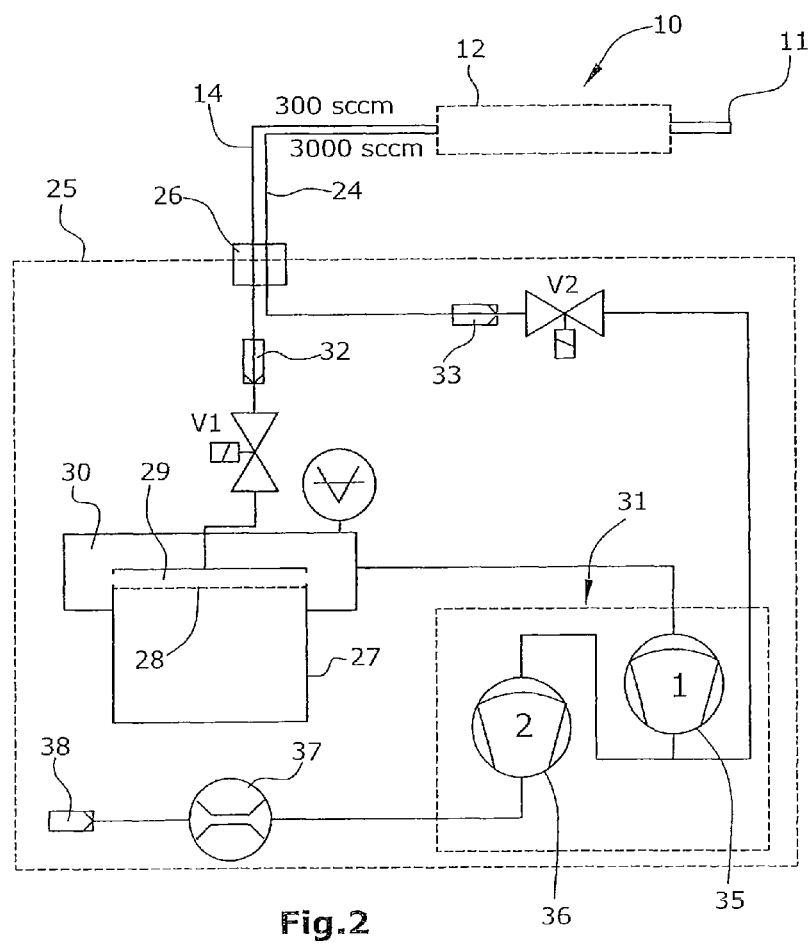
FIG. 2 is a view of a second embodiment wherein the gas conveying pump is accommodated in the main device.

FIG. 2 shows a further embodiment wherein the sniffing probe 10 again comprises a handle 12 with a sniffing tip 11. From sniffing probe 10, a first suction line 14 of a small diameter leads to the main device 25, and also a second suction line 24 leads to the main device. Both suction lines 14, 24 are detachably connected to the main device with the aid of a plug connector 26.

Main device 25 includes a test gas sensor 27 comprising a membrane 28 which is selectively permeable to the test gas and is arranged adjacent to a gas guiding chamber 29. Said chamber is located internally of a suction chamber 30 connected to a vacuum pump device 31. Within main device 25, the first suction line 14 leads via a filter 32 and a valve V1 into said gas guiding chamber 29. The second suction line 24 leads via a filter 33 and a shut-off member V2 to the vacuum pump device 31. The pump device includes a high-vacuum pump 35 and a pre-vacuum pump 36 which are connected in series. Second suction line 24 is connected to the suction inlet of pre-vacuum pump 36. The suction inlet of high-vacuum pump 35 is connected to suction chamber 30.

The outlet of pre-vacuum pump 36 is connected, via a flow sensor 37 and a filter 38, to the environment so that the sucked-in gas will be blown out.

Also in FIG. 2, examples of the gas quantities of suction lines 14 and 24 are inscribed.

To the sniffing leak detector of the disclosure, there are to be combined two operating modes which allow both for a high sensitivity and a high distance sensitivity. While the device is being used in standard-flow operation, i.e. in the closed state of shut-off member 17 or V2, the usual specifications of the device are reached. After opening the shut-off member, i.e. after switching the device to large flow, the device will be additionally sensitive to leaking gas in a larger distance. Thus, it is possible to first search for leaks by use of a high gas throughput and thus to detect a leak through operation with improved distance sensitivity, and then to exactly determine the leak quantitatively at reduced flow.

What is claimed is:

1. A sniffing leak detector comprising a sniffing probe which, via a first suction line leading to a test gas sensor, is connected to a main device including a vacuum pump device, wherein the sniffing probe is provided with a second suction line which is separate from and has a higher conveying capacity than the first suction line so that the first and second suction lines can be simultaneously open, and that said second suction line can be shut off and, without connection to the test gas sensor, is directly connected to a gas conveying pump for conveyance into an environment outside of the detector,
wherein the second suction line is connected to the gas conveying pump included in the main device, and
wherein, within the main device, a pump device comprising a vacuum pump and the gas conveying pump is provided for generating a vacuum for the test gas sensor, and that the second suction line is connected to the gas conveying pump.

2. The sniffing leak detector according to claim 1, wherein the sniffing probe comprises a handle which is provided with or connected to the second suction line.

3. The sniffing leak detector according to claim 1, wherein the conveying capacity of the second and first suction lines have a mutual ratio of at least 5:1.

4. The sniffing leak detector according to claim 1, wherein the test gas sensor is arranged in the main device.

5. The sniffing leak detector according to claim 1, wherein the conveying capacity of the second and first suction lines have a mutual ratio of at least 10:1.

* * * * *